March 10, 1959 F. S. MALICK 2,876,660
SUCCESSIVE INDEX MECHANISM
Filed Dec. 9, 1954 3 Sheets-Sheet 1

INVENTOR.
Franklin S. Malick
BY Arthur H. Seidel
Attorney

March 10, 1959  F. S. MALICK  2,876,660
SUCCESSIVE INDEX MECHANISM
Filed Dec. 9, 1954  3 Sheets-Sheet 3

INVENTOR.
Franklin S. Malick
BY
Arthur H. Seidel
Attorney

United States Patent Office 2,876,660
Patented Mar. 10, 1959

2,876,660

SUCCESSIVE INDEX MECHANISM

Franklin S. Malick, Milwaukee, Wis.

Application December 9, 1954, Serial No. 474,226

32 Claims. (Cl. 74—821)

This invention relates to mechanism for advancing pieces of work in indexed movements and it more specifically resides in an apparatus having a rotatable index member that is to be progressed through successive indexed positions, the member being rotated by electromagnetic means that include both driving windings and braking windings, there being provided a circuit network having a signal output indicative of the position of the index member to influence a circuit that regulates the currents of the driving and braking windings to thereby govern motion of the index member as it proceeds from one indexed position to the next.

Production rates in many machine operations, where a like operation is to be carried out upon a substantial number of work pieces, may be materially enhanced with the introduction of apparatus that rapidly feeds the plurality of work pieces successively to the work station where the machine operation is to take place. To this end, the present invention contemplates apparatus of general application for conveying work pieces in stepped movements, with a high degree of positional accuracy, through electrical control response to the motion of the work. The work conveyed by the apparatus is brought to a position of index, orientated with a work station for carrying out the machine operation, and upon completion of the work operation the apparatus is moved to a subsequent position of index, thereby orientating another portion of work for a repetition of the work operation.

To effectively handle a variety of pieces of work, each with rapid rates of movement between successive positions of index, it is essential that the apparatus control varying inertia loads without detrimental effect upon positional accuracy. Heretofore, apparatus has been furnished that includes a turntable, for carrying the pieces of work, driven between successive indexed positions by either fluid actuated or mechanically actuated mechanism. The application of power to the turntable is usually accomplished through either the use of an air valve or a clutch, such that the power is either fully applied or is completely disconnected. To brake the turntable as it approaches the final indexed position it has been a common expedient to employ direct mechanical connections that are subjected to severe shock as loading is encountered. The mechanical wear in such constructions becomes excessive and the ability to drive the higher inertia loads is curtailed.

In one embodiment of the present invention, control of movement of a rotatable index member between successive indexed steps is carried out through the employment of electromagnetic torque transmitting apparatus capable of driving and braking substantial inertia loads with rapid rates of acceleration and deceleration. For governing the excitation of electromagnetically operated torque transmitters, a control circuit is employed that utilizes information as to both position and velocity of the index member. Thus the motion of the index member, itself, governs the application of driving or braking torque. The arrangement is such that as the index member approaches an index position, velocity will correspond to the error in position with respect to index position, and the member comes to rest in position coinciding with the desired position of index. The circuit arrangement contains sufficient dampening characteristics to eliminate both overshooting position of index and the characteristics of hunting. Mechanical linkages for applying braking torques are eliminated and apparatus is provided that may handle substantial inertia without wear of mechanical parts that might otherwise cause frequent breakdown and interruption of service.

It is an object of this invention to provide an indexing mechanism for advancing pieces of work that is capable of handling substantial inertia loads while maintaining rapid rates of acceleration and deceleration and a high degree of positional accuracy.

It is another object of this invention to provide an index mechanism for advancing pieces of work in which the feed is brought into the index positions with a high degree of precision without the requirement of direct mechanical interlock between elements.

It is another object of this invention to provide an index mechanism for advancing pieces of work that is adapted for a versatility of use, in that variations in the inertia load presented to the apparatus may be handled without requiring special adjustment, or impairing the positional accuracy of the indexed positions.

It is another object of this invention to provide an index mechanism for advancing pieces of work that is compact and portable, for employment as an auxiliary attachment for a variety of existing machine tools to impart greater versatility to the use of such machine tools.

It is another object of this invention to provide an index mechanism for advancing pieces of work which may be set up upon a machine, with which it is to be employed, and readied for use within minimum time requirements.

It is another object of this invention to provide an index mechanism for advancing pieces of work successively in stepped movements between positions of index, in which the travel between such positions may easily and conveniently be varied to enhance the versatility of the apparatus.

It is another object of this invention to provide an index mechanism for advancing pieces of work in which accelerating torques that are imparted to an index member are drawn from the inertia of a constantly rotating power source, whereby the rotational energy of such source enables a reduction in the size of the power source.

It is another object of this invention to provide an index mechanism for advancing pieces of work that is rugged and sturdy to withstand abusive treatment without damage.

It is another object of this invention to provide an index mechanism for advancing pieces of work that operates from readily available electrical power sources, without the necessity of special installation of air or hydraulic power systems.

It is another object of this invention to provide an index mechanism for advancing pieces of work that employs a rotatable index member in conjunction with a feed back of information as to position and velocity of the member that dictates the driving and braking torques applied thereto.

The foregoing and other objects and advantages of this invention will appear in the description to follow. In the description, reference is made to the accompanying drawings, which form a part hereof, and in which there is shown by way of illustration and not of limitation a specific form in which the present invention may be embodied.

Figure 1:
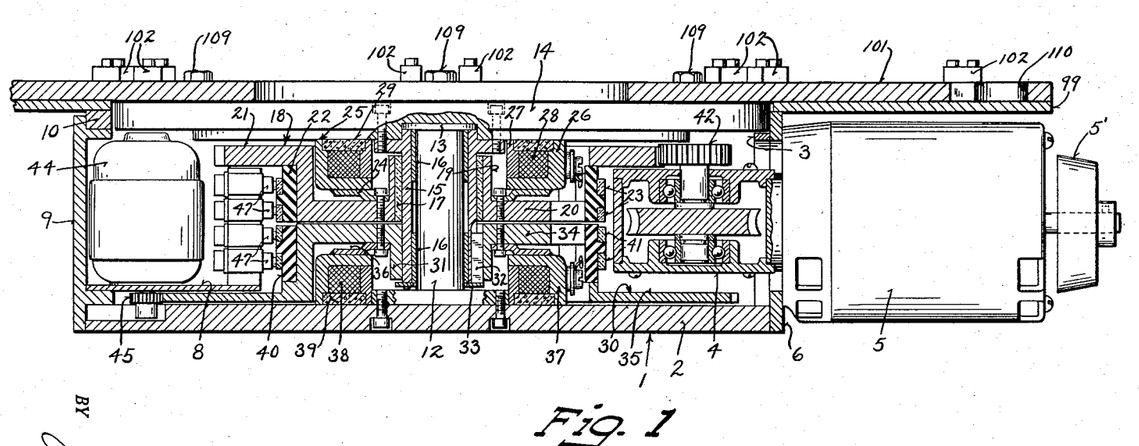
Fig. 1 is a view in elevation and in section of apparatus embodying the invention.
Figure 2:
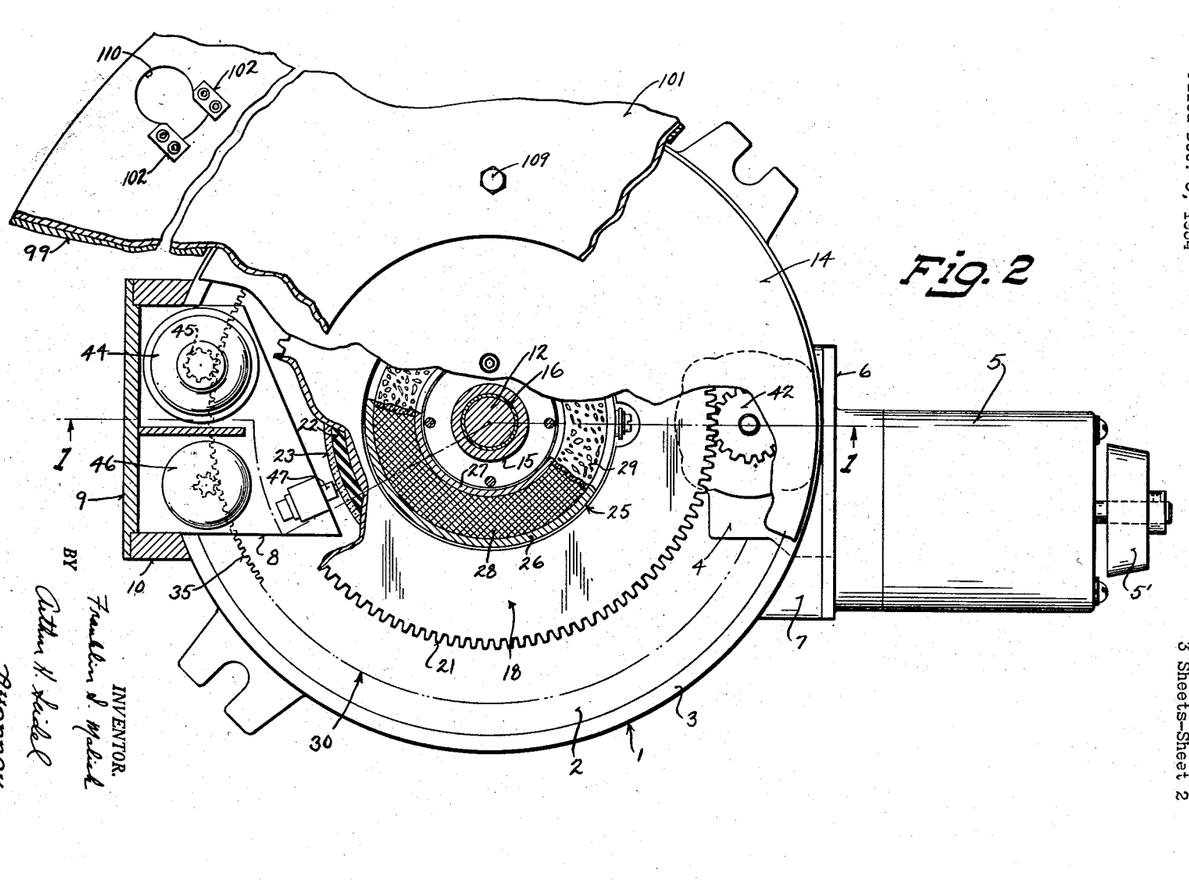
Fig. 2 is a plan view with parts broken away and in section of the apparatus shown in Fig. 1.

Referring now to the drawings, there is shown a casing 1 that may be cast with a circular base 2 and a cylindrical wall 3 rising upwardly from the peripheral margin of the base 2. The cylindrical wall 3 is interrupted at the right hand side of the apparatus to provide for the insertion of a reduction gear housing 4 attached to the casing of a drive motor 5, complete with a fly wheel 5'. The end of the motor 5, to which the reduction gear housing 4 is attached, is integral with a cover 6 attached to a frame 7 on the wall 3. The frame 7 surrounds the interruption in the wall 3, through which the reduction gear housing 4 is inserted, so that upon attachment of the cover 6 and motor 5 the interruption is fully enclosed.

The left hand side of the wall 3 is also interrupted, so that a control element platform 8 may be inserted within the casing 1. The platform 8 mounts apparatus to be hereinafter described, and is secured to a cover 9 that fits an opening presented by a framework 10 secured to the wall 3.

Concentrically located with respect to the base 2, and attached thereto by mounting screws 11, is an upright fixed stationary shaft 12. Capping the upper end of the shaft 12 is a bearing plate 13 and seated upon the plate 13 is a rotatable index plate 14. The plate 14 is circular in configuration, with the outer periphery overlapping the upper edge of the cylindrical wall 3.

Bolted to the underside of the index plate 14 is a rotatable quill shaft 15 that encircles the stationary shaft 12. A pair of sleeve bearings 16 are inserted between the fixed shaft 12 and the quill shaft 15 to retard the wear of rotating parts.

Encircling the upper portion of the quill shaft 15 is a tubular bearing 17, which in turn is encircled by a clutch drum 18 rotatable independently of the shaft 15. The clutch drum 18 comprises a central hub 19, fitted about the bearing 17, a bowl shaped portion 20 extending radially from the lower margin of the central hub 19, and an outer flange 21 extending radially from the upper margin of the bowl portion 20 in the form of a gear wheel. An insulating ring 22 encircles the bowl portion 20 of the drum 18, and mounted upon the ring 22 is a pair of slip rings 23.

A support rim 24 is bolted to the floor of the bowl portion 20 and mounted upon the rim 24 is an annular channel shaped magnetic flux path member 25. The channel of the flux path member 25 opens upwardly with the upper edges directly beneath the lower face of the index plate 14. As is shown, the magnetic flux path member 25 is comprised of a pair of ferro magnetic members 26 and 27 between which is disposed an annular clutch coil 28. Disposed above the coil 28 and seated upon suitable ledges in the members 26 and 27 is a clutch lining 29, the upper face of which is substantially flush with the upper edges of the members 26, 27 and directly beneath the index plate 14. Upon excitation of the clutch coil 28 magnetic flux passing through the members 26, 27 and the plate 14 moves the clutch elements into engagement with the underside of the plate 14. If the clutch structure be rotated, torque will thus be transmitted to the plate 14 through the frictional engagement of the members 26, 27 and the lining 29 with the plate 14. Torque transmittal may be varied by variation in the excitation of the coil 28.

Similar in form to the clutch drum 18 is a brake drum 30 that has a central hub 31 keyed to the quill shaft 15. A key 32, uniting the brake drum 30 with the quill shaft 15, is held in place by a retaining ring 33 secured to the bottom edge of the shaft 15. The brake drum 30 has a bell-like housing 34 directly beneath the bowl portion 20 of the clutch drum 18 and extending radially outwardly from the lower edge of the bell housing 34 is a flange forming a gear wheel 35. A rim 36 is bolted within the bell housing 34 and secured to the rim 36 is a magnetic flux path member 37 similar to the member 25. The member 37 is also composed of ferromagnetic members, with a brake coil 38 being embedded therein. A brake lining 39 extends across the underside of the coil 38. The lower ends of the flux path member 37 and the lower face of the brake lining 39 are disposed immediately above the inner floor of the casing base 2, so that braking torque may be exerted upon the quill shaft 15 and index plate 14 upon excitation of the brake coil 38. An insulating ring 40 is disposed about the bell portion 34, and a pair of slip rings 41 are mounted upon the insulating ring 40, as shown.

To supply a constant rotation to the clutch drum 18 the drive motor 5 is mounted upon the casing 1, as previously described, with the reduction gear housing 4 fitted within the casing 1 to present an output pinion 42 in mesh with the gear teeth of the clutch drum flange 21.

The platform 8 mounts a tachometer generator 44 which includes a pinion 45 in mesh with the gear wheel 35 of the brake drum 30, thus upon a rotation of the brake drum 30 a voltage signal will be obtained from the tachometer generator 44. Also mounted upon the platform 8 is a potentiometer 46, shown in Fig. 2, having a movable center tap 48, schematically shown in Fig. 4. The tap 48 is driven by a geared connection with the gear wheel 35 of the brake drum 30. In this manner a shift of the tap 48 of the potentiometer 46 corresponds to a shift in position of the index plate 14. For a selected arc of rotation for the index plate 14 between two successive positions of index, a gear ratio is provided such that the potentiometer tap 48 will travel through one complete rotation.

Also mounted upon the platform 8 is a set of four brushes 47 tiered one upon the other. The brushes 47 engage with the clutch and brake slip rings 23, 41. The clutch slip rings 23, in turn, are connected with the clutch coil 28, and the brake slip rings 41 are connected with the brake coil 38, to provide for the respective excitation of the coils 28, 38. Electrical leads for the brush connections, or for connections to the generator 44 and potentiometer 46, are not shown in Figs. 1 and 2 as the nature of such connections is well understood.

Figure 4:
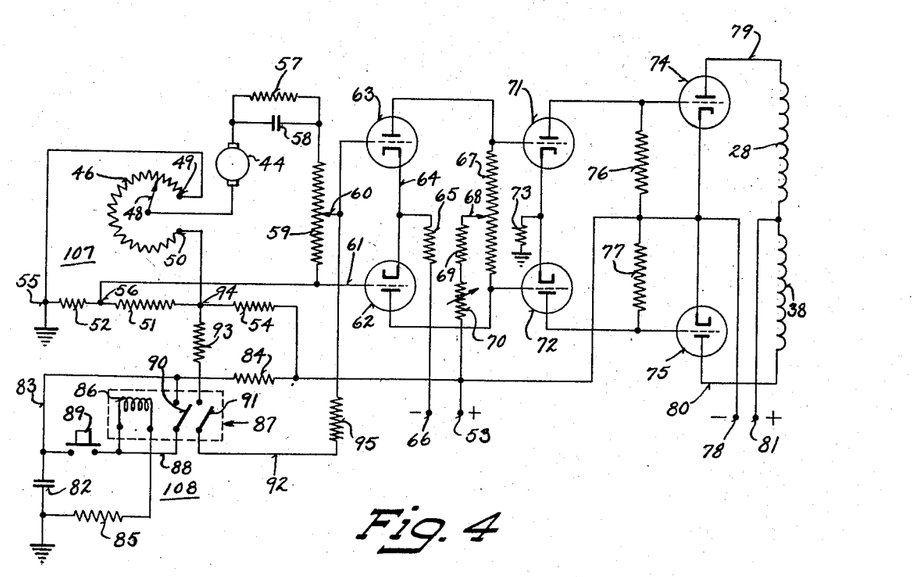
Fig. 4 is a wiring diagram of a control circuit, also embodying the invention, employed in conjunction with the apparatus of Figs. 1–3.

The electrical circuit in which the coils 28, 38, the brushes 47, the tachometer generator 44 and the potentiometer 46 are a part is shown schematically in Fig. 4. The potentiometer 46 with its center tap 48 and end taps 49 and 50 form two legs of a bridge network 107, completed by a first fixed bridge resistor 51 and a second fixed bridge resistor 52. A direct current potential supply is applied to the bridge network 107 from a positive terminal 53 through a limiting resistor 54 that connects with a bridge corner 94 and a ground connection at the opposite bridge corner 55. When the center tap 48 of the potentiometer 46 is in a position such that the potential drop between taps 50 and 48 is equivalent to that across the bridge resistor 51 the output voltage of the bridge network 107 taken between the center tap 48 and the bridge corner 56 is zero. This is the position of the center tap 48 corresponding to an indexed position of the plate 14, and if the plate 14 be rotated the position of the center tap 48 will be indicative of plate position by providing a variation in output voltage between the tap 48 and the bridge corner 56. For example, if the center tap 48 be shifted from the position shown in Fig. 4 clockwise toward the end tap 49 the output voltage of the bridge network 107 will increase. In practice the taps 49 and 50 are closely adjacent so that upon continued clockwise rotation the center tap 48 is rapidly moved to a position at, or clockwise of, the tap 50. Upon the tap 48 passing the tap 49 and contacting the tap 50, the voltage output of the bridge network 107 will change in polarity. Also, there will be an accompanying substantial increase in bridge output voltage. As the center tap 48 is now continued in the clockwise direction, thus returning toward its original position of rest, the potential output of the bridge network 107 will decrease and once again become zero as the center tap 48 assumes its original position. There is, therefore, provided an indicating network that is informative of plate position as it passes from one indexed position to the next.

One end of the tachometer generator 44 is connected to the center tap 48 of the potentiometer 46 and the other end is connected through a lead network comprising a resistor 57 and a capacitor 58 in parallel. The resistor 57 and capacitor 58 are tied at one end to a potential divider 59. The opposite end of the potential divider 59 is connected to the bridge corner 56, thus the outputs of the bridge network 107 and of the tachometer generator 44 are placed in series across the potential divider 59. The output voltage of the tachometer generator 44 is dependent upon the rotational speed of the plate 14, hence voltage appearing across the potential divider 59 will be a composite of a first signal indicating plate position and a second signal indicating plate velocity. A portion of the potential appearing across the potential divider 59 is picked off by the divider tap 60, and the lead 61 at one end of the divider 59. The lead 61 connects to a grid of an amplifier tube 62 and the tap 60 is joined to the grid of an amplifier tube 63. The cathodes of the tubes 62, 63 are joined together by a lead 64 and are connected through a resistor 65 to a negative terminal 66 of a potential source. The plates of the tubes 62, 63 are connected to opposite ends of a resistor 67 with a variable center tap 68. The center tap 68 is connected through a pair of resistors 69 and 70 to the positive terminal 53, to provide a source of plate voltage for the tubes 62, 63.

The opposite ends of the resistor 67 are each connected to the grid of one of the amplifier tubes 71, 72. The cathodes of the tubes 71, 72 are tied together and grounded through a resistor 73. The plate of the tube 71 is joined to a current valve in the form of a power tube 74 by a connection with the grid, and the plate of the tube 72 is joined to a current valve in the form of a power tube 75 by connection with the grid. The positive terminal 53 is connected through a resistor 76 to the plate of the tube 71 and through a resistor 77 to the plate of the tube 72, to provide a source of plate potential. A negative terminal 78 of a potential source is tied to the positive terminal 53 and through the resistors 76 and 77 to the grids of the power tubes 74, 75. The cathodes of the power tubes 74, 75 are tied together and also connected to the negative terminal 78. The plate of the tube 74 is connected through a lead 79 to one end of the clutch coil 28, while the plate of the tube 75 is connected through a lead 80 to an end of the brake coil 38. The opposite ends of the coils 28, 38 are connected together and joined to a positive terminal 81, paired with the negative terminal 78. The connections to the coils 28 and 38 are only schematically represented in Fig. 4, the brushes 47 and slip rings 23, 41 are, therefore, not shown.

In what has been a preferred practice of the invention, both clutch and brake coils 28, 38 carry substantial current when the plate 14 is in a position of index. The braking torque for this condition is sufficient to hold the plate 14 stationary, thus overcoming a substantial clutch torque. For governing movement of the plate 14 brake and clutch currents are varied in a manner such that upon an increase in one coil there is a corresponding decrease in the other. This change, in which a variation of current in one coil is accompanied by a substantially equal and opposite change in the other is herein termed a differential change. To accomplish this mode of operation the grids of the power tubes 74, 75 must likewise be controlled with differential potential changes. This calls for a differential change of the grids of the tubes 71, 72, or, in other terms, the voltage levels appearing at the ends of the resistor 67 must vary with opposite and equal changes. This performance must be secured from a signal output of the bridge network 107 and tachometer 44, that is fed to the amplifier circuit at the potential divider 59, which does not vary differentially. Thus, the grids of the tubes 62 and 63 are not influenced by differential changes in signal. The first amplifier stage, of which the tubes 62 and 63 are a part, is constructed with circuit constants that cause this first stage of amplification to operate in the manner of a paraphase amplifier. Such amplification is characterized in that the output thereof, appearing across the resistor 67, will exhibit differential voltage variations for the grids of the second stage of amplifier tubes 71, 72. Consequently, a change in the signal derived from the bridge network 107 and the tachometer 44 will cause differential changes in the currents of the clutch and brake windings 28, 38. It is to be understood that the amplifying network shown in the embodiment of the drawings may be varied in form without departing from the invention, and that if desired the magnetic amplifier type of current valve may be employed rather than the vacuum tube type.

A cycle initiating circuit network 108 also comprises a part of the diagram of Fig. 4. A capacitor 82 is grounded at one end and is connected at the opposite end through a lead 83 and a resistor 84 to the positive terminal 53. The grounded side of the capacitor 82 is connected through a resistor 85 to one side of the coil 86 of a start relay 87. The opposite end of the coil 86 is connected to a lead 88, which in turn is connected between one side of a normally open start button 89 and one side of a normally open set of relay contacts 90. The opposite side of the relay contacts 90 is joined to the lead 83, and the side of the start button 89 opposite that side connected with the lead 88 is likewise joined to the lead 83. A second normally open set of contacts 91, of the relay 87, is connected at one side through a lead 92 and a resistor 95 to the tap 60 of the potential divider 69, and the opposite side of the contacts 91 is connected through a resistor 93 to the bridge corner 94.

With the condenser 82 connected between ground and the positive terminal 53 it will obtain a charge. Upon a momentary closing of the start button 89 the charge upon the condenser 82 will cause a current to flow through the resistor 85 and relay coil 86 to excite the relay 87 for closure of the relay contacts 90, 91. The contacts 90 parallel the start button 89, so that the discharge current of the condenser 82, which is limited by the resistor 85, will continue to flow upon release of the start button 89. Upon closure of the contacts 91 a potential change occurs at the grid of the tube 63, that causes an increase in plate current. As a result the grids of the tubes 71, 72 are affected differentially, with the grid of the tube 71 becoming more positive. A like change then occurs at the grids of the power tubes 74, 75, to increase clutch coil current and decrease brake coil current. The momentary change in clutch and brake coil currents initiates rotation of the plate 14 from its position of index, to the extent that the potentiometer tap 48 is rotated to or beyond the tap 50.

The discharge of the condenser 82 is quite rapid, for example, it may occur within a tenth of a second. Upon condenser discharge, the relay 86 is no longer excited and the contacts 90, 91 reopen. The condenser 82 will now again be charged for a successive operation, and a charge time of approximately one second has heretofore been satisfactorily employed in apparatus embodying the invention.

Figure 3:
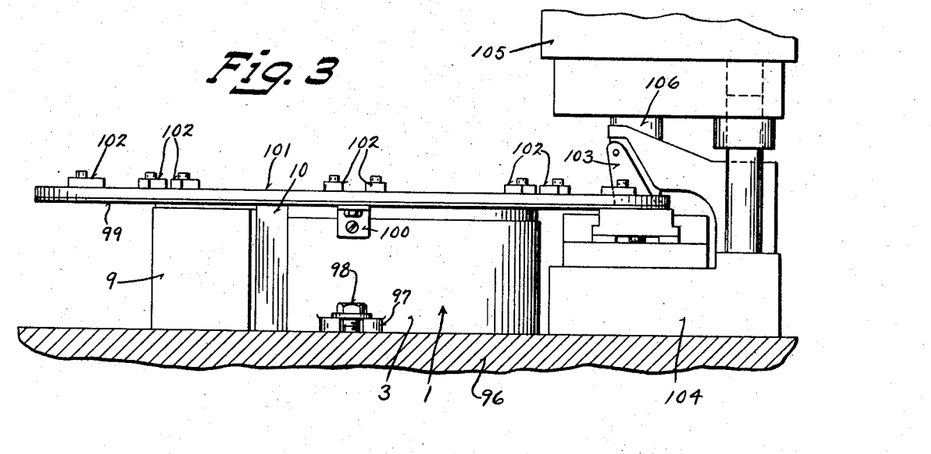
Fig. 3 is a view in elevation of the apparatus shown in Figs. 1 and 2 placed upon the bed of a punch press.

Referring now more specifically to Fig. 3, the casing 1 is shown mounted upon a bed 96 of a typical punch press. A pair of mounting wings 97, that extend from the casing wall 3, receive mounting bolts 98 that are secured in the press bed 96. A slide 99, in the form of a rim encircling the index plate 14, is secured in position by a number of brackets 100. Immediately above the slide 99 is a table 101 bolted upon the index plate 14, by bolts 109 shown in Fig. 1. Table 101 includes a plurality of circumferentially spaced openings 110 with adjacent upstanding ribs 102 that receive pieces of work 103, one of which is shown, that are to have an operation performed thereon by the press. By feeding work pieces 103 into the openings 110 and rotating the index plate 14 through successive indexed positions, the table 101 will carry the work pieces 103 toward, into and from a work position in a die 104. The positions of index for the plate 14 each correspond with a proper alignment of a work piece 103 in the die 104, so that the press head 105 may be brought downwardly to carry punches in a mounting 106 through the piece 103 to perform the work function.

With the apparatus, that has been described, readied for operation, the motion of the index plate 14 from rest at a position of index toward its successive position of index is initiated by momentary closure of the start button 89. As has been described, a voltage is momentarily applied to the grid of the tube 63 and the amplification stages cause a differential change in clutch and brake currents to rotate the plate 14 to move the potentiometer center tap 48 to, or beyond, the end tap 50. The output of the bridge network 107 now causes a voltage drop to appear across potential divider 59 that constitutes an information signal to the amplifying circuits. This signal causes a maximum differential change in output of the power tubes 74, 75 when the tap 48 contacts the tap 50, the signal diminishing as the tap 48 continues clockwise to its initial position. The differential change that now occurs increases clutch current, and the plate 14 is rapidly accelerated.

Tachometer output rises with the speed of the index plate 14, to lessen clutch current and increase brake current, as the plate 14 reaches maximum rotational velocity. With continued rotation of the plate 14 output of the bridge network 107 decreases, as noted, and the combined bridge and tachometer outputs will transmit a signal to the amplifier circuit to have braking torque exceed the driving torque of the clutch. The plate 14 is rapidly halted, and it comes to rest in the position of index without hunting or overshooting.

The information derived from the bridge network 107 and tachometer 44 govern index plate movements, so that index position may fall within 10/1000 of an inch on a twenty-four inch circle. The fixed bridge resistors 51, 52 set a standard voltage signal that dictates index position for the index plate 14. In this invention a signal indicating plate position is matched against the standard voltage signal to determine position error of the feeding mechanism for the pieces of work. Both position error and the rotational speed of the plate 14 determine driving and braking torques, that are each present during the entire cycle of movement between successive positions of index. In this manner smooth acceleration and deceleration is attainable through electromagnetic control.

To afford rapid response to the signals of the tachometer the lead network comprising resistor 57 and capacitor 58 is employed. The more rapid transient signal changes are passed without delay, to offset inherent inductive lags in the clutch and brake coil circuits.

Among the advantages of the invention is the provision for braking an index member that has been set in motion, by the employment of electro-magnetic control that is responsive to the conditions of motion of the index member. The electro-magnetic control of the braking function, provides a means of applying a sufficient braking force with the advantage of obtaining both a high degree of accuracy for the position of rest and making feasible the use of an apparatus that is rugged and of long life.

I claim:

1. In a mechanism for advancing pieces of work in indexed movements the combination of a rotatable index member movable in a stepped motion between progressive indexed positions to cause a piece of work to be moved toward, into and from a position of index; an electromagnetic clutch including energizing windings having a continuously rotating driving element and a driven element in driving relation to said index member; an electromagnetic brake including energizing windings having a movable element carried by said index member and a stationary element; a pair of current controlling elements one each for said clutch and brake windings that are connected thereto to pass current to the windings in response to electrical control signals; an index member position signal network for providing a signal voltage indicative of index member position; a velocity indicator signal source for providing a signal voltage indicative of index member velocity, and a circuit network joining the output of said index member position signal network and said velocity indicator signal source in circuit relation with said current controlling elements for altering the currents passing therethrough to said brake and clutch windings in response to index member position and velocity.

2. In a mechanism for advancing pieces of work in indexed movements the combination of a rotatable index member movable in a stepped motion between progressive indexed positions; an electromagnetic clutch including energizing windings and having a driving element and a driven element in driving relation to said index member; an electromagnetic brake including energizing windings and having a movable element carried by said index member and a stationary element; a pair of current valves one each for said clutch and brake windings that are connected thereto and adapted to control current flowing in the windings; an index member position signal network including a variable resistance actuated by movement of said index member for providing a signal voltage that decreases in magnitude as said index member moves toward an indexed position; a velocity indicator signal source for providing a signal voltage indicative of index member velocity as it moves between indexed positions; a circuit network joining said index member position signal network and said velocity indicator signal source with the voltages thereof in opposing relation; and an amplifier stage interposed between said circuit network and said current valves applying a signal varying in response to the combined voltages of said signal network and said signal source to said current valves for altering the currents passing therethrough such that upon an increase in one there is a decrease in the other.

3. In a mechanism for advancing pieces of work in indexed movements the combination of a rotatable index member movable in a stepped motion between progressive indexed positions; a drive motor; an electromagnetic clutch having energizing windings that includes a driving element rotated in one direction by said drive motor and a driven element engageable with said driving element upon excitation of the clutch windings that is in driving relation to said index member; an electromagnetic brake having energizing windings that includes a stationary element and a movable element carried by said index member engageable with said stationary element upon excitation of said brake winding to exert braking torque on said index member; a pair of current valves one each for said clutch and brake windings that are each connected to its associated windings for control of the magnitude of current conducted through the windings; an index member position signal network for providing a signal voltage indicative of index member position; and a circuit network joining said index member position signal network in circuit with said current valves for altering the currents passing therethrough in response to index member position.

4. A mechanism in accordance with claim 3 in which said position signal network comprises a resistance bridge having two fixed legs for connection between a potential source and a variable potentiometer with a movable center tap cooperatively joined to said index member and a pair of end taps also for connection between the potential source; said bridge having output connections between the fixed legs and at the potentiometer center tap whereby the output voltage is negligible when said index dial is in an indexed position and varies when said index member is out of indexed position to indicate the position thereof.

5. A mechanism in accordance with claim 4 having a start circuit network including switch means that upon closure applies a voltage to the circuit network joining the signal network to the current valves simulating an out of index position signal voltage whereby currents within said current valves are altered to initiate a clutching action to start rotation of said index member from one index position to another.

6. In a mechanism for advancing pieces of work in indexed movements the combination of a rotatable index member movable in a stepped motion between progressive indexed positions; a drive motor; an electromagnetic clutch having energizing windings that includes a driving element and a driven element in driving relation to said index member; an electromagnetic brake including energizing windings and having a movable element carried by said index member and a stationary element; a pair of current valves one each for said clutch and brake windings that are connected thereto to control current flow therein; an index member position signal network for providing a signal voltage varying with index member position; a circuit network having an input connected to said signal network to receive a signal voltage therefrom and an output in connection with said current valves to control the current flowing through said valves, and hence said clutch and brake windings, said network having an output when said input receives a signal voltage corresponding to index position of said index member that causes said current valves to carry currents for clutch and brake torques that retain said index member at rest; and a start circuit network including switch means for causing a voltage to be applied to said circuit network that increases clutch current with respect to brake current to rotate said index member from position of index, whereby said index member position signal network applies a signal voltage to said circuit network tending to cause a clutch current flow greater than that for index position until a subsequent position of index is reached.

7. A mechanism in accordance with claim 6 having a velocity indicator signal generator in driven relation to said index member with the output thereof connected in opposition to the signal voltage of said index member position signal network.

8. In a feed mechanism for advancing pieces of work in indexed movements the combination of an index member movable in a given direction of rotation with a stepped motion between progressive indexed positions; a drive motor; an electromagnetic clutch having energizing windings that includes a driving element and a driven element in driving relation to said index member; an electro-magnetic brake including energizing windings and having a movable element carried by said index member and a stationary element; a source of excitation for the windings of said brake and clutch; a pair of current valves one for each of said clutch and brake windings having load current conducting elements connected between said source of excitation and said windings and control elements whereby electrical potential applied to the control elements regulates current passing through the clutch and brake windings; an index member position indicator circuit network including a reference voltage element and a variable potential member having a movable element in driven relation to said index member whereby a voltage between the reference element and variable potential member is indicative of index member positions, there being a potential in one sense of polarity upon a shift of the index member from index position through a minor arc in the direction of rotation increasing in magnitude with shift, there being a potential in the opposite sense of polarity upon a shift of said index member beyond said minor arc that diminishes in value as said index member approaches a subsequent position of index; and a circuit network joining said indicator circuit network to the control elements of said current valves that places potential changes of opposite effect upon said valve control elements in response to output voltage changes of said index member position indicator network to regulate clutch and brake torques.

9. A mechanism in accordance with claim 8 having a velocity indicator signal generator in driven relation to said index member with the output thereof connected in opposition to the signal voltage of said index member position indicator circuit network.

10. In a mechanism for causing pieces of work to progress in indexed movement the combination comprising a rotatable index member for unidirectional movement between successive positions of index; electromagnetic torque transmitting means in driving engagement with said index member having a driving winding and a braking winding, which means is adapted to apply torque to the index member to cause rotation upon excitation of the driving winding and to apply a braking torque to said index member upon excitation of the braking winding; a pair of current valves one for each of said driving and braking windings having load current conducting elements connected to said valves and control elements, whereby the electrical potential applied to the control elements regulates current passing through said driving and braking windings; an index member position indicator circuit network including a reference voltage element and variable potential means having a movable element in driven relation to said index member whereby a voltage between the reference element and variable potential means is indicative of index member position, there being a potential in one sense upon a shift of the index member from index position through a minor arc in the direction of rotation increasing in magnitude with shift from index position, there also being a potential in the opposite sense upon a shift beyond the minor arc that diminishes in value as said index member approaches a subsequent index position; and an amplifier circuit network joining said indicator circuit network to said control elements that places potential changes of opposite effect upon said control elements upon a change in potential output of said indicator circuit network, to thereby regulate driving and braking torques in response to index member position.

11. A mechanism in accordance with claim 10 wherein when the movable element of the index member position indicator circuit network corresponds to an index position of said index member the current valves pass currents through the driving and braking windings that cause substantially equal torques in each to be produced.

12. A mechanism in accordance with claim 10 having a velocity indicator means with elements in driven relation to the index member productive of a signal voltage indicative of index member velocity and which is connected in opposition to said index member position indicator circuit network.

13. A mechanism in accordance with claim 12 having a start circuit network including switch means with contacts movable between normal and operated positions that applies a voltage upon moving said switch contacts to operated position to said amplifier circuit network with a voltage of polarity like that of said index member position indicator circuit when said index member is moved from index position past said minor arc, thereby initiating a movement of the index member away from an indexed position.

14. In a mechanism for advancing pieces of work in indexed movement the combination of a movable index member to be moved between successive indexed positions; electromagnetic driving and braking means for said index member including a driving winding and a braking winding; an index member position network cooperative with said index member for providing a signal voltage indicative of index member position; a velocity indicator cooperative with said index member for providing a signal voltage indicative of index member velocity; and a circuit network combining the outputs of said index member position network and said velocity indicator and connecting the same in circuit with said driving and braking windings for altering the currents passing therethrough in response to index member position and velocity.

15. A mechanism in accordance with claim 14 in which said circuit network has an input resistance to which the outputs of said index member position network and said velocity indicator are applied, an amplifier stage, and output leads joined to the driving and braking windings, the amplifier stage controlling the potential of the output leads so as to vary inversely with one another upon a change in potential across said input resistance and so as to be responsive to the polarity of a potential appearing across said input resistance, and the amplifier stage further applying potentials to the output leads that retain the index member in set position when no signal appears across the input resistance.

16. A mechanism in accordance with claim 15 having a start circuit including an initiating switch with normal and initiating positions which places a voltage upon said input resistance when said switch is moved to initiating position that causes the amplifier stage to increase driving winding current with respect to braking winding current to initiate index member movement.

17. In a mechanism for advancing pieces of work in indexed movement the combination of a base plate, a shaft rising upwardly from the base plate, a rotatable index member elevated above said base plate bearingly mounted upon and extending radially from the upper end of said shaft, a quill shaft attached to said index member extending down from the index member and encircling said shaft, an electromagnetic brake with a toroidal winding encircling said shaft having an element attached to said quill shaft spaced beneath said index member and an element being a part of said base plate, and an electromagnetic clutch with a toroidal winding encircling said shaft with a driving element rotatably mounted upon said quill shaft for rotation independent thereof that is disposed above said brake and with a driven element being a part of said index member.

18. In a mechanism for advancing pieces of work in indexed movement the combination of a base plate of magnetic material; a shaft rising upwardly from the base plate; a rotatable index member of magnetic material spaced above said base plate bearingly mounted upon and extending radially from said shaft including a quill shaft encircling said shaft for rotation with respect thereto; an electromagnetic brake member with energizing windings and a magnetic flux member encircling said shaft that are attached to said quill shaft for rotation therewith, whereby excitation of said brake windings causes frictional engagement between the base plate and flux member; an electromagnetic clutch member with energizing windings and a magnetic flux member encircling said shaft that are mounted upon said quill shaft for rotation independent thereof, whereby excitation of said clutch windings causes frictional engagement between the clutch flux member and index member; and driving means connected to said clutch magnetic flux member to rotate the same.

19. In a mechanism for advancing pieces of work in indexed movement the combination of a base plate, a shaft rising upwardly from the base plate; a rotatable index member spaced above said base plate bearingly mounted upon and extending radially from said shaft including a quill shaft encircling said shaft for rotation with respect thereto; an electromagnetic brake having an element attached to said quill shaft spaced beneath said index member and an element being a part of said base plate; an electromagnetic clutch with a driving element rotatably mounted upon said quill shaft for rotation independent thereof that is disposed above said brake and with a driven element being a part of said index member; an index member position network cooperative with said member for providing a signal voltage indicative of index member position; a velocity indicator cooperative with said index member for providing a signal voltage indicative of index member velocity; and a circuit network joining the outputs of said index member position network and said velocity indicator in circuit with the electromagnetic brake and electromagnetic clutch for altering the currents passing therethrough in response to index member position and velocity.

20. In an apparatus for moving pieces of work in indexed movement the combination of a member movable in successive like movements between positions of index; an electro-magnetically operated drive for said member; an electromagnetically operated brake for said member; a signal emitter cooperatively engaged with said member including a reference signal source indicative of index position and a position signal source indicative of member position and having a comparing network with a signal output indicative of member position with respect to index position; and a power circuit between said signal emitter and said brake and drive having an input that receives a signal from said signal emitter and a pair of outputs one of which is joined to said brake and the other of which is joined to said drive, which power circuit delivers output current that varies through a range of values dependent upon variation in signal output of said signal emitter to apply varying torque to said member that is dependent in value upon member position.

21. In an apparatus for moving pieces of work in indexed movement the combination of a member movable in successive like movements between positions of index; an electromagnetically operated drive for said member; an electromagnetically operated brake for said member; a signal emitter cooperatively engaged with said member including a reference signal source indicative of index position and a position signal source indicative of member position and having a comparing network with a signal output indicative of member position with respect to index position; a power circuit between said signal emitter and said brake and drive having an input that receives a signal from said signal emitter and a pair of outputs one of which is joined to said brake and the other of which is joined to said drive, which power circuit delivers output current that varies through a range of values dependent upon variation in signal output of said signal emitter to apply varying torque to said member that is dependent in value upon member position; and a start signal source joined with said power circuit adapted to apply a signal to said power circuit to operate said drive for initiating movement of said member.

22. In an apparatus for moving pieces of work in indexed movement the combination of a member movable in successive like movements between positions of index; an electromagnetically operated drive for said member; an electromagnetically operated brake for said member; a signal emitter cooperatively engaged with said member including a reference signal source indicative of index position and a position signal source indicative of member position and having a comparing network with a signal output indicative of member position with respect to index position; a velocity indicator driven by said member having a signal output indicative of member velocity electrically joined with said signal emitter with the signal output in opposition to that of the emitter; and a power circuit feeding said electromagnetically operated drive and brake governed by the signal output of said signal emitter driving and braking said member in response to member position.

23. In a mechanism for advancing pieces of work in indexed movements the combination of a rotatable index member movable in a stepped motion between progressive indexed positions to cause a piece of work to be moved toward, into and from a position of index; a first electromagnetic torque transmitter including energizing windings in torque transmitting relation to said index member; a second electro-magnetic torque transmitter including energizing windings in torque transmitting relation to said index member to apply torque in opposition to said first torque transmitter; an index member position signal network for providing a signal voltage indicative of index member position; a velocity indicator signal source for providing a signal voltage indicative of index member velocity, and a circuit network joining the output of said index member position signal network and said velocity indicator signal source in circuit relation with said first and second torque transmitter windings for altering the currents passing therethrough in response to index member position and velocity.

24. In a mechanism for advancing pieces of work in indexed movement the combination of a movable index member to be moved between successive indexed positions; electro-magnetic driving and braking means for said index member including a first winding that when energized causes the means to impart driving torque to said index member and a second winding that when energized causes the means to apply braking torque to the index member; an index member position network cooperatively related to said index member for providing a signal voltage indicative of index member position; a velocity indicator cooperatively related to said index member for providing a signal voltage indicative of index member velocity; and a circuit network joining the outputs of said index member position network and said velocity indicator in circuit with said first and second windings for altering the currents passing therethrough in response to index member position and velocity.

25. In a mechanism for advancing pieces of work in indexed movement the combination of a movable index member to be moved between successive indexed positions; electro-magnetic driving and braking means for said index member including a first winding that when energized causes the means to impart driving torque to said index member and a second winding that when energized causes the means to apply braking torque to the index member; an index member position network cooperatively related to said index member for providing a signal voltage varying through a range of values to be indicative of index member position; and a circuit network joining said index member position network with said first and second windings, said circuit network having a pair of outputs joined respectively to said first and second windings and a differential circuit feeding said outputs that provides differential output currents dependent upon member position whereby torque varying through a range of values is applied to said index member in response to index member position.

26. In a mechanism for advancing pieces of work in indexed movement the combination of a movable index member to be moved between successive indexed positions; electro-magnetic driving and braking means for said index member including a first winding that when energized causes the means to impart driving torque to said index member and a second winding that when energized causes the means to apply braking torque to the index member; a velocity indicator cooperatively related to said index member for providing a signal voltage indicative of index member velocity; and a circuit network joining said velocity indicator with said first and second windings, said circuit network having a pair of outputs joined respectively to said first and second windings and a differential circuit feeding the outputs to provide varying output currents dependent upon index member velocity whereby torque varying through a range of values is applied to said index member.

27. In a mechanism for advancing pieces of work in indexed movement the combination of a movable index member; velocity imparting means for said index member to drive said member; an electromagnetic brake having control windings cooperatively related to said index member for retarding motion imparted to said index member by said velocity imparting means; an index member position network cooperatively related to said index member for providing a signal voltage indicative of index member position; a velocity indicator cooperatively related to said index member for providing a signal voltage indicative of index member velocity; and a circuit network joining the outputs of said index member position network and said velocity indicator in circuit with said control windings for altering the currents passing therethrough in response to index member position and velocity.

28. In a mechanism for advancing pieces of work in indexed movement the combination of a movable index member; velocity imparting means for said index member to drive said member; a variable torque electromagnetic brake having control windings that produce braking torque when energized varying in value with changes in current flowing therein, which brake is cooperatively related to said index member for retarding motion imparted to said index member by said velocity imparting means; an index member position network including a voltage source that provides a continuous voltage output and which is cooperatively related to said index member to vary the voltage output with index member position for providing a signal voltage indicative of index member position; and a circuit network joining said index member position network to said control windings, which circuit network includes an output supplying output currents varying through a range of values dependent upon change in index member position.

29. In a mechanism for advancing pieces of work in indexed movement the combination of a movable index member; velocity imparting means for said index member to drive said member; a variable torque electromagnetic brake having control windings that produce braking torque when energized varying in value with changes in current flowing therein, which brake is cooperatively related to said index member for retarding motion imparted to said index member by said velocity imparting means; a velocity indicator cooperatively related to said index member for providing a signal voltage indicative of index member velocity; and a circuit network joining said velocity indicator to said control windings, which circuit network includes an output supplying output currents varying through a range of values dependent upon change in index member velocity.

30. In a mechanism for driving a member in indexed steps the combination comprising an index member to be driven between positions of index; a position signal circuit cooperatively related to said index member to provide a voltage signal indicative of index member position and which signal decreases as the member moves toward a position of index; a velocity indicator cooperatively related to said index member to provide a signal proportional to index member velocity; electromagnetic means for accelerating and decelerating said index member; connections joining the position signal circuit and velocity indicator in opposition to provide a composite signal; an input circuit between said connections and said electromagnetic means to cause the electromagnetic means to drive the index member upon the composite signal being predominated by the position signal circuit and to brake the index member upon the composite signal being predominated by the velocity indicator, whereby the index member velocity is proportional to its position and decreases to zero as a position of index is assumed.

31. An apparatus in accordance with claim 30 in which said electromagnetic means comprises a friction clutch having a clutch winding and a friction brake having a brake winding each of said windings being joined to said input circuit to simultaneously have currents passed therethrough for simultaneous clutching and braking applied to said index member; and there being a driving means joined to said clutch whereby said index member is driven by said driving means through said clutch.

32. An apparatus in accordance with claim 30 having a starting circuit connected to said input circuit adapted to place a signal in said input circuit causing the electromagnetic means to drive the index member from a position of index.

References Cited in the file of this patent
UNITED STATES PATENTS

| | | |
|---|---|---|
| 1,155,124 | Berger | Sept. 28, 1915 |
| 2,537,269 | Harding | Jan. 9, 1951 |
| 2,575,792 | Bullard | Nov. 20, 1951 |
| 2,627,647 | Hautau | Feb. 10, 1953 |
| 2,662,146 | Wilentchik | Dec. 8, 1953 |
| 2,672,067 | Hensell | Mar. 16, 1954 |
| 2,697,470 | Sampatacos et al. | Dec. 21, 1954 |
| 2,739,626 | Southworth et al. | Mar. 27, 1956 |